United States Patent
Mori et al.

(10) Patent No.: US 6,757,086 B1
(45) Date of Patent: Jun. 29, 2004

(54) HOLOGRAM FORMING APPARATUS AND METHOD, AND HOLOGRAM

(75) Inventors: Shigeru Mori, Kanagawa (JP); Akira Shirakura, Tokyo (JP); Nobuhiro Kihara, Kanagawa (JP); Takahiro Toyoda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/710,328

(22) Filed: Nov. 9, 2000

(30) Foreign Application Priority Data

Nov. 12, 1999 (JP) ............................................. 11-323444

(51) Int. Cl.[7] ............................ G03H 1/30; H04N 13/00
(52) U.S. Cl. ............................... 359/25; 359/1; 348/43; 348/53; 348/47; 382/154
(58) Field of Search ................................ 359/1, 23, 24, 359/25, 22, 32; 348/43, 53, 44, 47; 382/153; 345/8; 353/7

(56) References Cited

U.S. PATENT DOCUMENTS

| | | | | |
|---|---|---|---|---|
| 4,834,476 A | * | 5/1989 | Benton | .......................... 359/23 |
| 5,337,096 A | * | 8/1994 | Qu et al. | ......................... 353/7 |
| 6,111,597 A | * | 8/2000 | Tabata | .......................... 348/43 |
| 2002/0113865 A1 | * | 8/2002 | Yano et al. | .................... 348/47 |

* cited by examiner

Primary Examiner—Audrey Chang
(74) Attorney, Agent, or Firm—Frommer Lawrence & Haug LLP; William S. Frommer; Dennis M. Smid

(57) ABSTRACT

The image data generator 1 produces image data for recording into a holographic stereogram. The image data generator 1 combines a stereo image model being at least a part of a three-dimensional object image prepared in advance with a separately captured image to provide a synthetic image and produces a parallax image train from the synthetic image. The three-dimensional object image prepared in advance and stereo image model being the part of the three-dimensional object are supplied from the 3D image source 4 to the image data generator 1. The image data generator 1 is also supplied with a two-dimensional image separately captured from the photographic unit 5 such as a digital still camera for example.

3 Claims, 7 Drawing Sheets

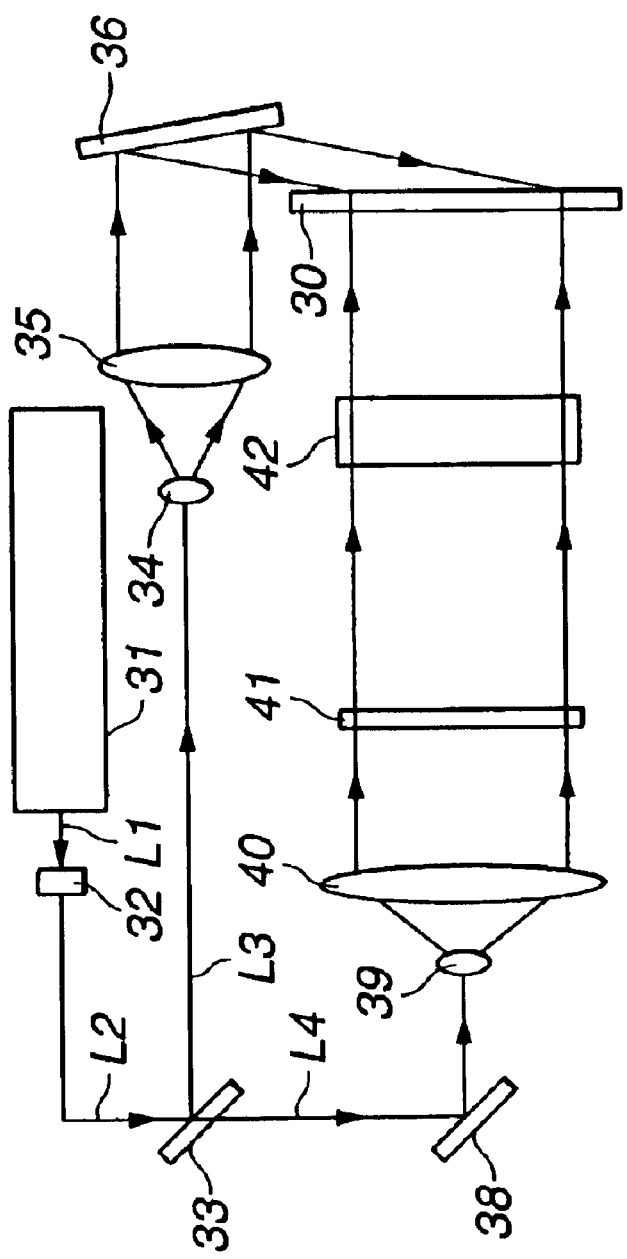
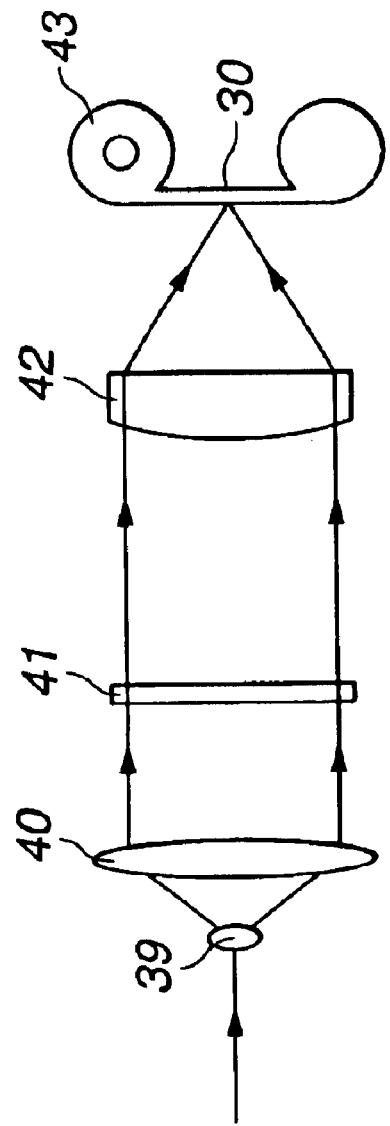
FIG.4A
FIG.4B

HOLOGRAM FORMING APPARATUS AND METHOD, AND HOLOGRAM

BACKGROUND OF THE INVENTION

1. Field of the Invention

The present invention relates to a hologram forming apparatus and method, and also to a hologram formed by the apparatus and method.

2. Description of the Related Art

A holographic stereogram is produced by sequentially recording many images formed by sequentially photographing an object from different points of view, as rectangular or dot-like element holograms on a single hologram recording medium.

Referring now to FIG. 1, there is shown a conventional method for producing holographic stereogram. For example, to form a holographic stereogram having parallax information only in the horizontal direction, first an object 100 is photographed sequentially from different points of view to provide a sequence of parallax images 101 formed from a plurality of images having the parallax information in the horizontal direction. Then, images 102 in the sequence of parallax images 101 are sequentially recorded as rectangular element holograms in a hologram recording medium 103 so that the parallax images will be in succession in the horizontal direction. Thus, a holographic stereogram having the parallax information in the horizontal direction is provided.

In the holographic stereogram, the information of the plurality of images 102 obtained by sequentially photographing the object from different horizontal points of view are sequentially recorded as rectangular element holograms so that they are in succession in the horizontal direction. So, when the holographic stereogram is viewed by the viewer with his or her both eyes, different two-dimensional images will be incident upon the right and left eyes, respectively. Thus, the viewer will feel a parallax and a three-dimensional image will be reconstructed from the different two-dimensional images. Namely, it has been proposed to record only a three-dimensional image in the hologram recording medium.

The parallax image trains from which the holographic stereogram is produced can be formed by moving a camera 104 in parallel to an object 100 for example as shown in FIG. 2 with the camera 104 directed towards the object 100 and kept constantly so directed, thereby taking many pictures of the object 100 from different positions. More specifically, the camera 104 directed towards the object 100 is moved in parallel to the object 100 from a beginning position of a photographic range of the camera 104 to an end position where the object 100 is out of the photographic range, and thus, while moving the camera 104 kept constantly directed as in the above within the photographic range, many pictures of the object 100 are taken from different angles of viewing. Thus parallax images from which a holographic stereogram is produced can be obtained. Note that this method for taking many pictures of the object 100 from different positions by moving the camera 104 in parallel to the object 100 with the camera 104 kept constantly directed as in the above is called "straight track" system.

For 3D (three-dimensional) printing of the images in a hologram, original 3D image data are produced from pictures taken of an object using a special imaging method such as parallel or rotational movement of the camera. Also, the original 3D image data can be produced by the computer graphics (CG).

As mentioned above, printing of a real-object image in a hologram needs to actually photograph the real object by a camera or the like. In this case, the special photography is necessary as in the above and to this end, a special equipment is also required. Conventionally, much labor, techniques and costs are needed for the photography.

OBJECT AND SUMMARY OF THE INVENTION

Accordingly, the present invention has an object to overcome the above-mentioned drawbacks of the prior art by providing a hologram forming apparatus and method, capable of holographically printing an image photographed using no special imaging method as a stereo image.

The present invention has another object to provide a holographic stereogram formed by artificially acquiring image information which would have to be in a great amount from a very small number of 2D image information.

The above object can be attained by providing a hologram forming apparatus including according to the present invention:

means for pasting a separately produced image on a stereo image model showing at least a part of a three-dimensional object previously prepared to produce a synthetic image; and means for producing parallax image train from the synthetic image from the image synthesizing means.

Also the above object can be attained by providing a hologram forming method including, according to the present invention, steps of:

pasting a separately produced image on a stereo image model showing at least a part of a three-dimensional object previously prepared to produce a synthetic image; and producing a parallax image train from the synthetic image produced at the synthesizing step.

Also the above object can be attained by providing a hologram forming apparatus including according to the present invention:

first means for producing a three-dimensional object image train containing a stereo image model in at least a part thereof;

second means for producing a train of images produced separately; and means for pasting the image train produced by the second image train producing means on the stereo image model of the three-dimensional object image train produced by the first image train producing means to synthesize a parallax image train.

Also the above object can be attained by providing a hologram forming method including, according to the present invention:

a first step of producing a three-dimensional object image train containing a stereo image model in at least a part thereof, a second step of producing a train of images produced separately; and a step of pasting the image train produced at the second image train producing step on the stereo image model of the three-dimensional object image train produced at the second image train producing step to synthesize a parallax image train.

Also the above object can be attained by providing a hologram having recorded therein a parallax image train produced from an image synthesized by pasting a separately produced image on a stereo image model showing at least a part of a three-dimensional object previously prepared.

Also the above object can be attained by providing a hologram having recorded therein a parallax image train produced from an image synthesized by pasting a train of separately produced images on a train of three-dimensional object images containing a stereo image model in at least a part thereof.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 4 shows the optical system of the holographic stereogram printer;

DETAILED DESCRIPTION OF THE PREFERRED EMBODIMENTS

First, the total construction of the holographic stereogram forming system will be described herebelow. Note that in the holographic stereogram forming system, a film-like hologram recording medium having recorded thereon an interference fringe resulted from an interference between object and reference beams is outputted directly as a holographic stereogram. The holographic stereogram having the fringe of interference between the object and reference beams recorded directly in the hologram recording medium is generally called "one-step holographic stereogram". That is, the holographic stereogram forming system which will be described in detail below is one example of the systems for forming such a one-step holographic stereogram.

Figure 1:
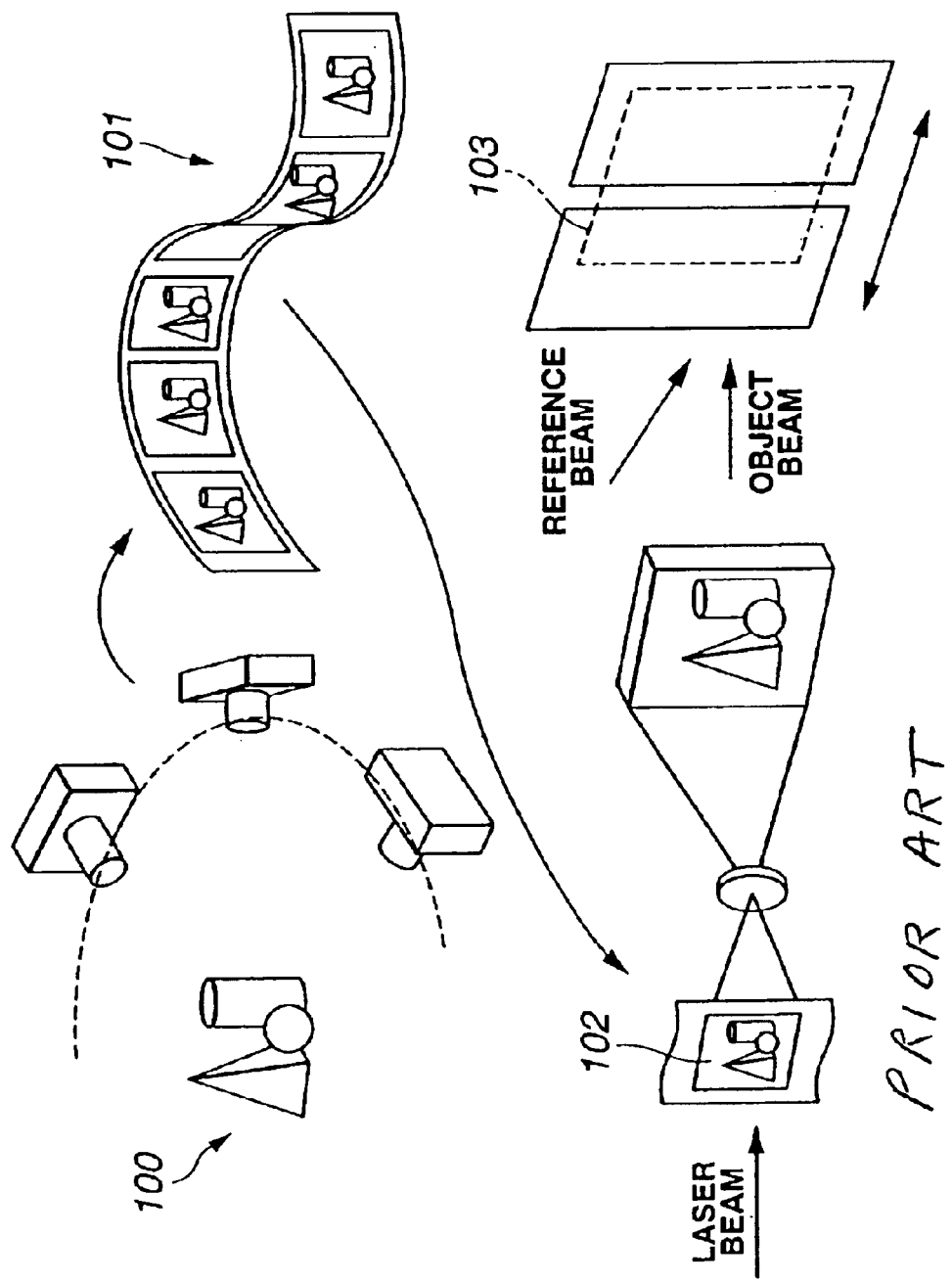
FIG. 1 explains the conventional method for producing holographic stereogram.
Figure 2:
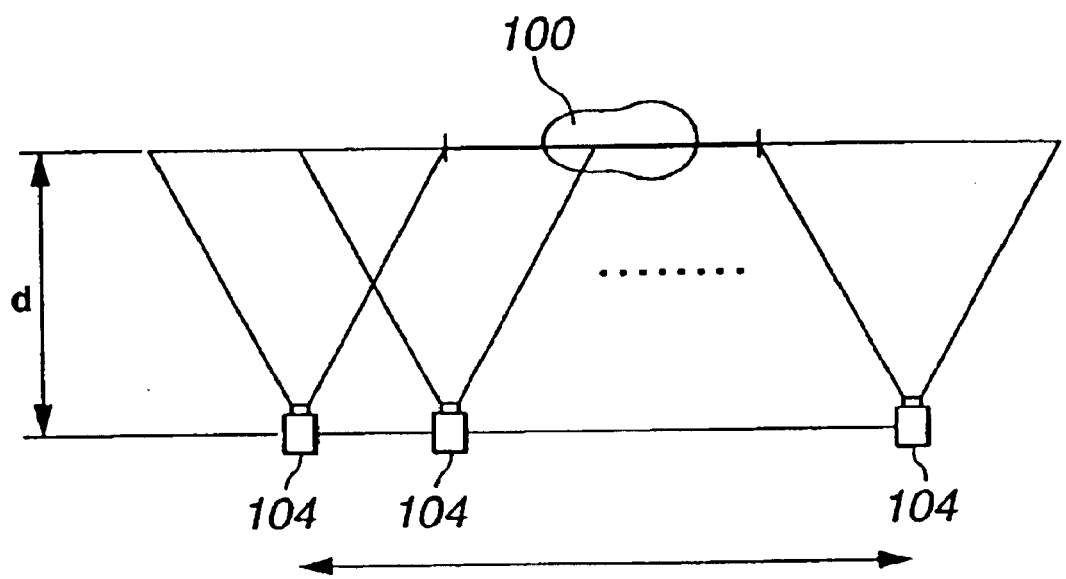
FIG. 2 explains the straight track system.
Figure 3:
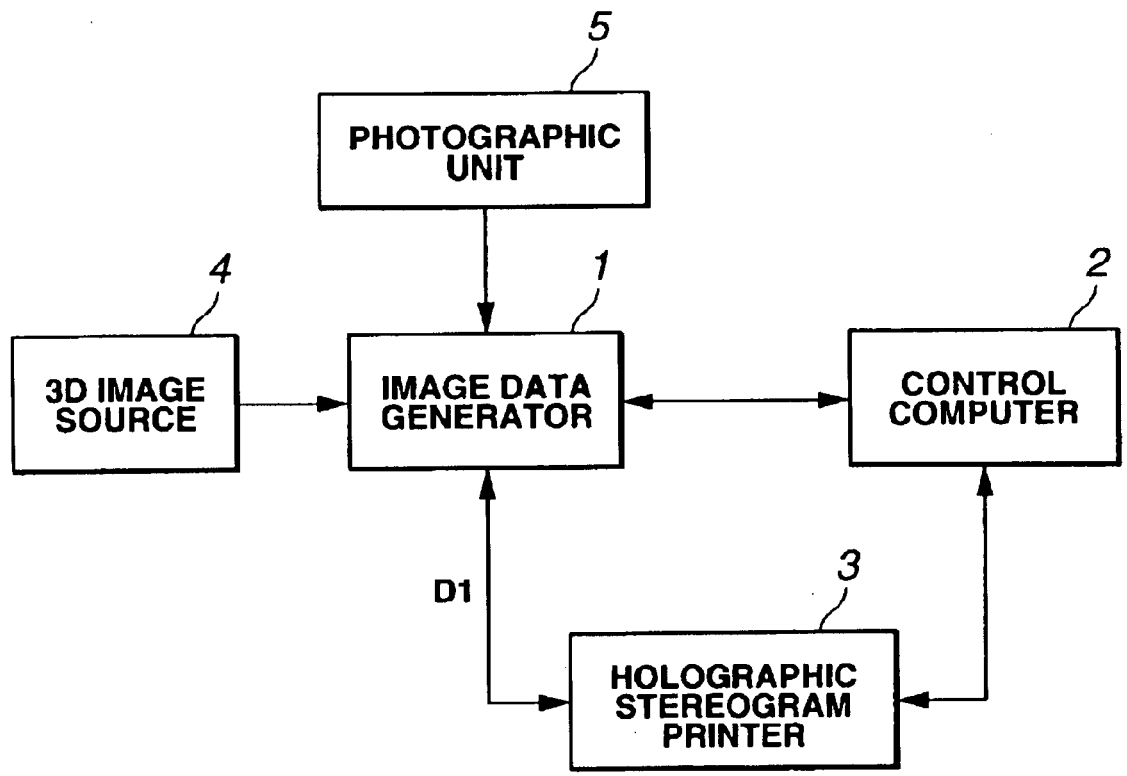
FIG. 3 is a block diagram of the holographic stereogram forming apparatus according to the present invention.

As shown in FIG. 3, the holographic stereogram forming system includes an image data generator 1 to produce data on images which are to be recorded in a holographic stereogram, a control computer 2 to control the entire system, and a holographic stereogram printer 3 having an optical system intended to form a holographic stereogram.

The image data generator 1 produces data on a plurality of images corresponding to a plurality of element holograms which are to be recorded in a holographic stereogram (namely, data on parallax image train). Note that the production of image data by the image data generator 1 will further be described later. Briefly, separately captured images are combined with a stereo image model being at least a part of a three-dimensional object previously prepared to produce a synthetic image from which a parallax image train is produced. The three-dimensional object previously prepared and the stereo image model which is the part of the three-dimensional object are supplied from a 3D image source 4 to the image data generator 1. Also, the image data generator 1 is supplied with a two-dimensional image separately produced by a photographic unit 5 such as a digital camera or the like.

When recording an image in a holograph recording medium, the image data generator 1 sends produced image data D1 for one image to the holographic stereogram printer 3 in an order of recording to the hologram recording medium, and sends to the control computer 2 a timing system indicating that the image data D1 has been sent, each time the image data D1 for one image is sent to the holographic stereogram printer 3.

According to the timing signal sent from the image data generator 1, the control computer 2 drives the holographic stereogram printer 3 to sequentially record in a hologram recording medium set inside the holographic stereogram printer 3 an image based on the image data D1 produced by the image data generator 1 as a rectangular element hologram.

At this time, the control computer 2 will control an exposure shutter and recording medium feeding mechanism provided in the holographic stereogram printer 3 as will further be described later. That is, the control computer 2 will send a control signal to the holographic stereogram printer 3 to control the opening and closing operation of the exposure shutter, hologram recording medium feeding operation of the recording medium feeding mechanism, etc.

The holographic stereogram printer 3 prints element images on the hologram recording medium correspondingly to the parallax image train generated by the printing image processor 4. The holographic stereogram printer 3 will be described in detail with reference to FIG. 4. FIG. 4A is top view of the entire optical system of the holographic stereogram printer 3, and FIG. 4B is a side elevation of a portion, for the object beam, of the optical system of the holographic stereogram printer 3.

As shown in FIG. 4A, the holographic stereogram printer 3 includes a laser source 31 to emit a laser beam having a predetermined wavelength, an exposure shutter 32 and half mirror 33 disposed on the optical axis of a laser beam L1 from the laser source 31.

The exposure shutter 32 is controlled by the control computer 2 to be closed for no exposure of the hologram recording medium 30 to the laser beam and opened for exposure of the hologram recording medium 30 to the laser beam. The half mirror 33 is provided to split a laser beam L2 having passed through the exposure shutter 32 into reference and object beams. A beam L3 reflected by the half mirror 33 is the reference beam, while a beam L4 having passed through the half mirror 33 is the object beam.

On the optical axis of the beam L3 reflected by the half mirror 33, there are disposed a cylindrical lens 34, collimator lens 35 to collimate the reference beam into a parallel beam, and a total reflection mirror 36 to reflect the parallel beam from the collimator lens 35, in this order. These optical parts form together an optical system for the reference beam.

The beam reflected by the half mirror 33 is first diverged by the cylindrical lens 34, and then collimated into a parallel beam by the collimator lens 35. Thereafter, the parallel beam is reflected by the total reflection mirror 36 and incident upon the hologram recording medium 30.

On the other hand, on the optical axis of the beam L4 having passed through the half mirror 33, there are disposed a total reflection mirror 38 to reflect the beam having passed through the half mirror 33, spatial filter 39 being a combination of a convex lens and pinhole, collimator lens 40 to collimator the object beam into a parallel beam, display screen 41 on which an image to be recorded is displayed, and a cylindrical lens 42 to converge the object beam onto the hologram recording medium 30, in this order as shown in FIGS. 4A and 4B. These optical parts form together an optical system for the object beam.

The beam L4 having passed through the half mirror 33 is reflected by the total reflection mirror 38, then diverged by the spatial filter 39 (as a divergent beam from a point beam source), collimated into a parallel beam by the collimator lens 40 and then is incident upon the display screen 41. The display screen 41 is a transparent image display made of a liquid crystal for example, and displays thereon an image based on image data D1 sent from the printing image generator 1. The beam having passed through the display screen 41 is modulated correspondingly to the image displayed on the display screen 41, and then incident upon the cylindrical lens 42.

Then, the beam having passed through the display screen 41 is laterally focused by the cylindrical lens 42, and the focused beam is incident as an object beam upon the hologram recording medium 30. Namely, at the holographic stereogram printer 3, the projected beam from the display screen 41 is incident as a rectangular object beam upon the hologram recording medium 30.

Of the reference beam and object beam, the reference beam is incident upon one of the main sides of the hologram recording medium 30 while the object beam is incident upon the other main side of the hologram recording medium 30. That is, the reference beam is incident at a predetermined angle of incidence upon one main side of the hologram recording medium 30, while the object beam is incident upon the hologram recording medium 30 so that its optical axis will be nearly perpendicular to the hologram recording medium 30. Thus, the reference beam and object beam will interfere with each other on the hologram recording medium 30, and an interference fringe generated by the interference is recorded as a change of the refractive index on the hologram recording medium 30.

This holographic stereogram printer 3 for printing a holographic stereogram includes the recording medium feeding mechanism 43 which feeds the hologram recording medium 30 intermittently under the control of the control computer 2. Each time one image based on the image data D1 produced by the image data generator 1 is recorded as one element image on the hologram recording medium set in a predetermined condition in the recording medium feeding mechanism 43, the recording medium feeding mechanism 43 feeds the hologram recording medium 30 for one element hologram according to the control signal from the control computer 2. Thus, the images based on the image data D1 generated by the image data generator 1 are sequentially recorded on the hologram recording medium 30 to be horizontally contiguous to each other.

In the holographic stereogram printer 3, the optical path of the reference beam reflected by the half mirror 33 and incident upon the hologram recording medium 30 should preferably be nearly equal in length to that of the object beam having passed through the half mirror 33 and incident upon the hologram recording medium 30 through the display screen 41. When these optical paths are so equal to each other, the interference between the reference and object beams is increased, resulting in an improved quality of the holographic stereogram.

Also, in the holographic stereogram printer 3, there may be disposed on the optical path of the object beam a dispersion plate to improve the quality of the holographic stereogram. The dispersion plate disposed on the optical path of the object beam disperses noise component included in the object beam for a more uniform intensity distribution of the object beam incident upon the hologram recording medium and an improved quality of a formed holographic stereogram.

When the dispersion plate is disposed, however, there should preferably be provided between the dispersion plate and hologram recording medium 30 a mask having formed therein a rectangular opening corresponding to the shape of each element hologram. With such a mask, an excessive portion of the object beam dispersed by the dispersion plate will be intercepted by the mask, thereby permitting to form a higher-quality holographic stereogram.

Also in the holographic stereogram printer 3, there may be displayed on the optical path of the object beam a one-dimensional dispersion plate to disperse the longitudinal vertical angle of visibility. Owing to the one-dimensional dispersion plate disposed on the optical path of the object beam, the object beam will be dispersed longitudinally, namely, in the direction of the major axis of each formed element hologram. Thus, the formed holographic stereogram will have a longitudinal angle of visibility.

However, when the one-dimensional dispersion player is disposed as in the above, there should preferably be disposed between the hologram recording medium 30 and one-dimensional dispersion plate a louver film having a fine blind-like grid. With the louver film disposed in this manner, it is possible to prevent the reference beam having passed through the hologram recording medium 30 from being reflected by the one-dimensional dispersion plate and being incident upon the hologram recording medium 30 again.

The holographic stereogram forming system constructed as in the above functions as will be described below:

When forming a holographic stereogram, the image data generator 1 sends image data D1 to the display screen 41 of the holographic stereogram printer 3 and allows the display screen 31 to display an exposure image based on the image data D1 thereon. At this time, the image data generator 1 sends to the control computer 2 a timing signal indicating that the image data D1 has been sent to the display screen 41 of the holographic stereogram printer 3.

Upon reception of the timing signal, the control computer 2 sends a control signal to the exposure shutter 32 which will thus be opened for a predetermined time. Thus, the hologram recording medium 30 is exposed to the laser beam.

At this time, of the laser beam L2 having been emitted from the laser source 31 and having passed through the exposure shutter 32, the laser beam L3 reflected by the half mirror 33 is incident as a reference beam upon the hologram recording medium 30. Also, the laser beam L4 having passed through the half mirror 33 has projected thereon the image displayed on the display screen 41, and incident as an object beam upon the hologram recording medium 30. Thus, the exposure image displayed on the display screen 41 is recorded as a rectangular element hologram on the hologram recording medium 30.

When recording of one image on the hologram recording medium 30 is complete, the control computer 2 sends a control signal to the recording medium feeding mechanism 43 to feed the hologram recording medium 30 for one element hologram.

The above operations are repeated with the exposure images displayed on the display screen 41 sequentially rearranged in the order of parallax images in train. Thus, exposure images based on the image data produced by the image data generator 1 are recorded as rectangular element holograms one after another on the hologram recording medium 30.

Note that during sequential recording of element holograms, the hologram recording medium 30 will oscillate somehow as the case may be when the hologram recording medium 30 is fed by the recording medium feeding mechanism 43. In such a case, each time the hologram recording medium 30 is fed, the element holograms are recorded after the oscillation is settled down.

As in the above, in the holographic stereogram forming system, a plurality of exposure images based on image data produced by the image data generator 1 are sequentially displayed on the display screen 41, the exposure shutter 32 is opened for each of the exposure images, and then the exposure images are sequentially recorded as rectangular element holograms on the hologram recording medium 30. At this time, since the hologram recording medium 30 is fed for one element hologram per image, the element holograms will be arranged horizontally in succession. Thus, a parallax image train consisting of a plurality of images including horizontal parallax information is recorded on the hologram recording medium 30 as a plurality of horizontal successive element holograms to provide a holographic stereogram having a horizontal parallax.

Figure 5:
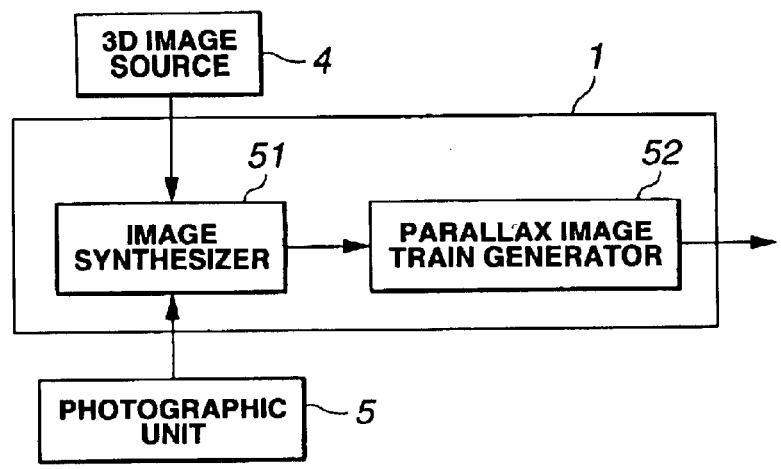
FIG. 5 is a block diagram of the data generator forming the holographic stereogram forming apparatus.

Next, the image data generator 1 used in the holographic stereogram forming system will be described in detail below:

The image data generator 1 combines a three-dimensional object image previously prepared by the 3D image source 4 and a two-dimensional image from the photographic unit 5 to produce a synthetic image, and produces from the synthetic image a parallax image train consisting of a plurality of images and from which a holographic stereogram is formed. As shown in FIG. 5, the image data generator 1 includes an image synthesizer 51 and parallax image train generator 52.

The image synthesizer 51 is provided to combine a three-dimensional object image from the 3D image source 4 and a stereo image model being at least a part of the three-dimensional object image with a two-dimensional image picked up by the photographic unit 5. The parallax image train generator 52 is to produce a parallax image train by rendering a synthetic image from the image synthesizer 51.

The 3D image source 4 has stored therein a 3D image acquired using the computer graphic (CG) or actual photography. The photographic unit 5 has stored in an internal recording medium thereof a two-dimensional image acquired by photography.

Figure 6:
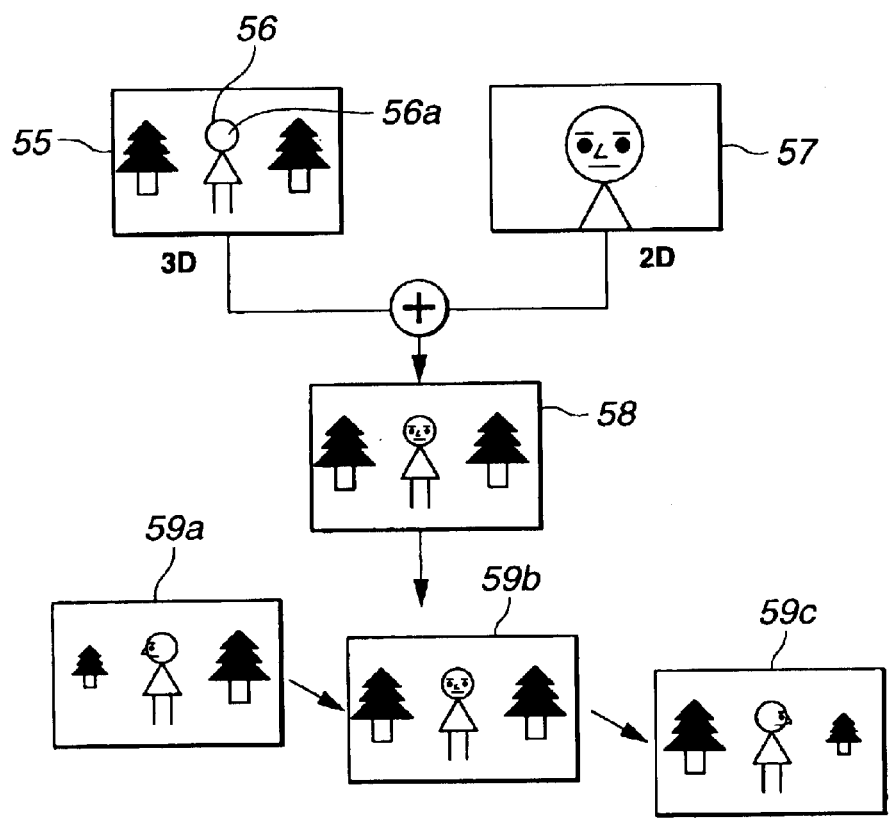
FIG. 6 explains a concrete example of the operations effected for production of a parallax image train by the data generator shown in FIG. 5.

The a parallax image train production by the image data generator 1 will be described in detail below with reference to FIG. 6:

First, a 3D image 55 from the 3D image source 4 and a two-dimensional image 57 from the photographic image 5 are combined by the image synthesizer 51. The 3D image 55 has formed therein a stereo image model 56 of a person having no eyebrows, eyes, nose, mouth, etc. and thus no expression in a face 56a being a three-dimensional polygon model. The two-dimensional image 57 is a human face having eyebrows, eyes, nose, mouth, etc. and thus an expression. This human face is combined with the face 56a being the three-dimensional polygon model. Thus, a synthetic image 58 is resulted from the combination of the two-dimensional image 57 with the three-dimensional polygon image 56a in the 3D image. The parallax image train generator 52 produces a parallax image train 59 consisting of images 59a, 59b and 59c by rendering and re-arranging, for hologram, the synthetic image 58. Namely, the image data generator 1 combines the static 2D image with the 3D image, and totally renders the combined images to produce a parallax image train.

In this way, the image data generator 1 constructed as shown in FIG. 5 can paste a separately captured still image on a stereo image model (e g., polygon model) and combine a two-dimensional image and a three-dimensional image thereby producing a parallax image train. Thus, the image data generator 1 can produce a parallax image train without using any special imaging method.

The image data forming the a parallax image train is sequentially displayed on the display screen 41 of the holographic stereogram printer 3 as having been described above. Then, the exposure shutter 32 is opened for each image, and each of the images is sequentially recorded as a rectangular element hologram on the hologram recording medium 30.

Figure 7:
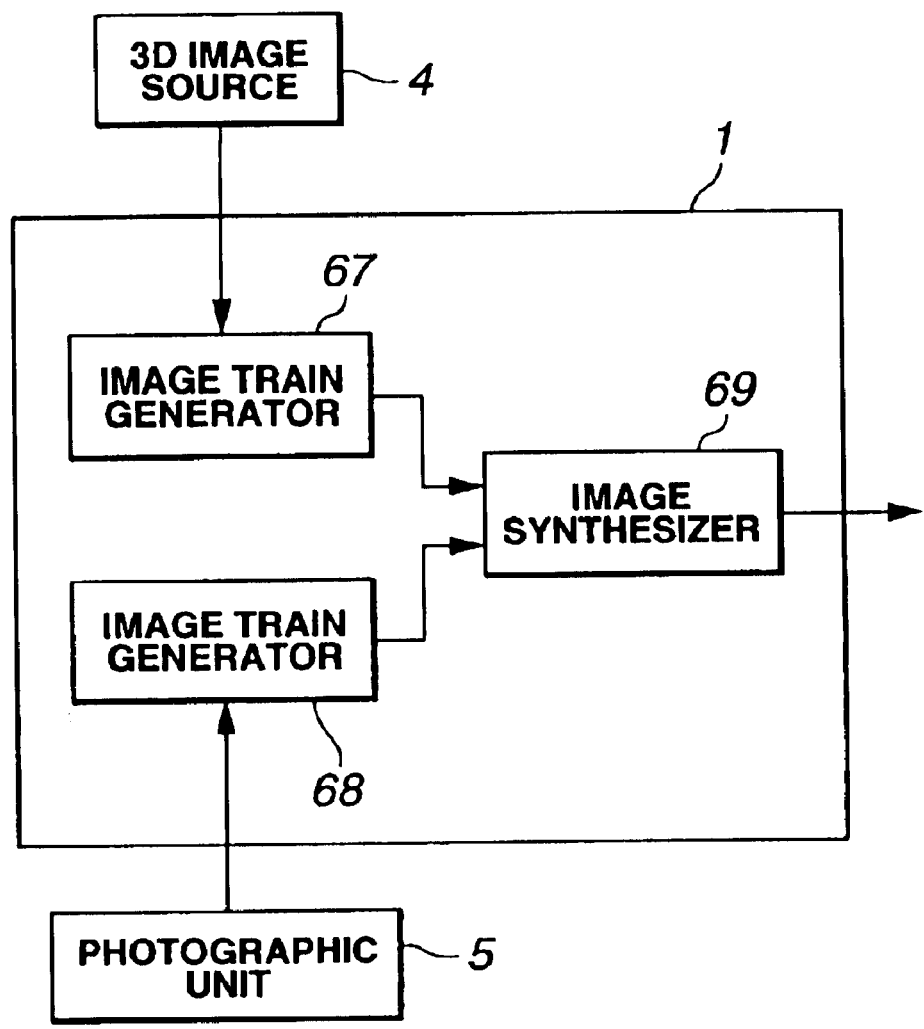
FIG. 7 is a block diagram of a variant of the data generator in FIG. 5.

Note that the image data generator 1 may be adapted to produce a train of images of a three-dimensional object previously prepared by the 3D image source 4 and a two-dimensional image train from the photographic unit 5 and combine these trains to produce a parallax image train. In this case, the image data generator 1 includes an image train generator 67 for a 3D image, image train generator 68 for a still image, and an image synthesizer 69 as shown in FIG. 7.

The image train generator 67 for a 3D image renders a three-dimensional object image from the 3D image source 4 and a 3D image consisting of a stereo image model being at least a part of the 3D object to produce a 3D image train. The image train generator 68 for a still image renders a two-dimensional image from the photographic unit 5 to produce a two-dimensional image train. The image synthesizer 69 combines the 3D image train from the image train generator 67 for a 3D image and a two-dimensional image train from the image train generator 68 for a still image to produce a parallax image train.

The production of a parallax image train by another embodiment of the image data generator 1 will be described below with reference to FIG. 8.

Figure 8:
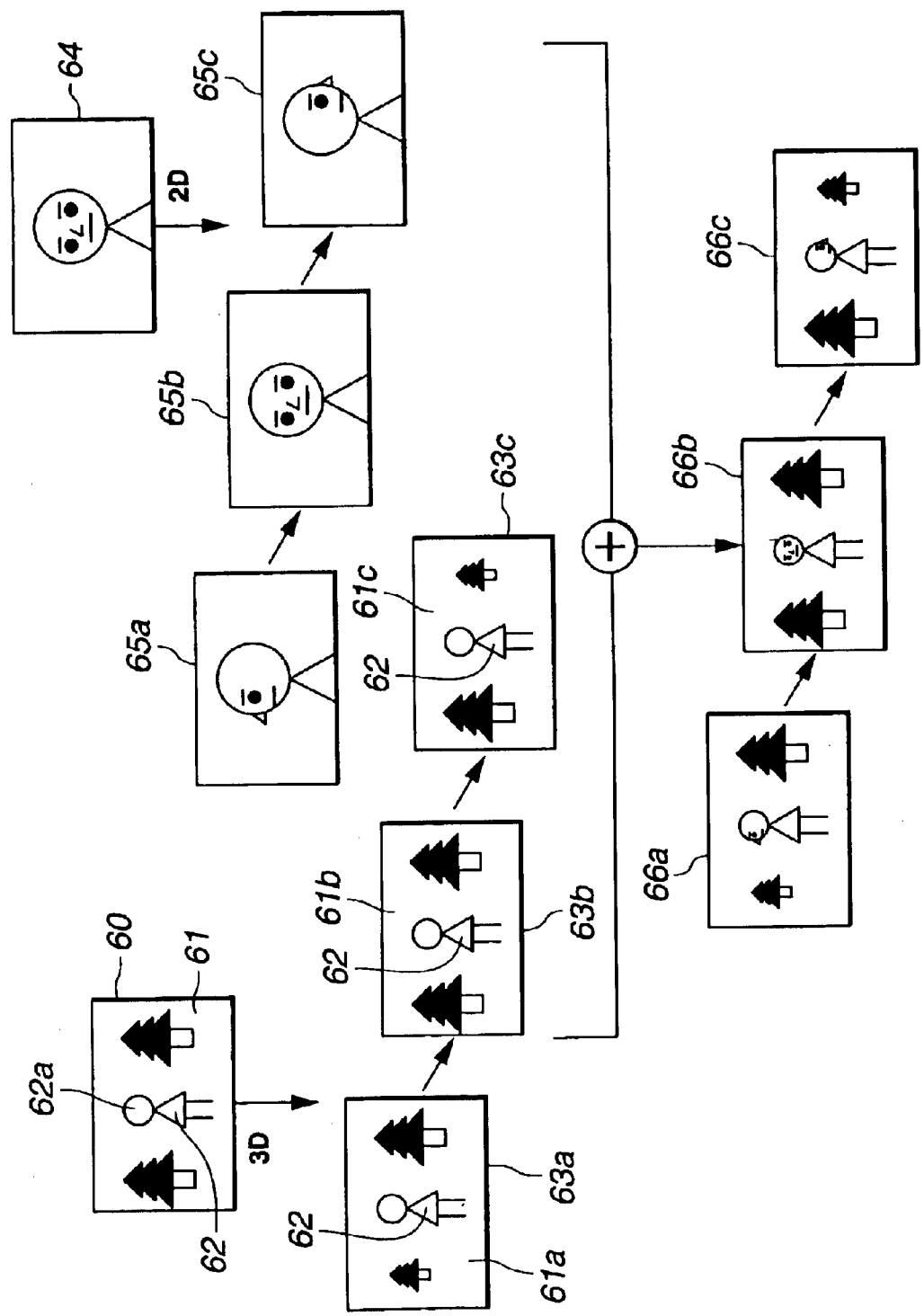
FIG. 8 explains a concrete example of the operations effected for production of a parallax image train by the variant of the data generator in FIG. 7.

As shown in FIG. 8, a 3D image 60 shows a background 61 including two trees and a stereo image model 62 of a person. The stereo image model 62 is a face 62a which is a three-dimensional polygon model having no eyebrows, eyes, nose, mouth, etc. and thus no expression. Also in FIG. 8, a two-dimensional image 64 is a human face having eyebrows, eyes, nose, mouth, etc. and thus an expression.

First, the 3D image 60 from the 3D image source 4 is rendered by the 3D image train generator 67 to produce 3D images trains 63a, 63b and 63c. At this time, the two trees in the background 61 are changed by rendering to be backgrounds 61a, 61b and 61c.

Next, the two-dimensional image 64 from the photographic unit 5 is rendered by the two-dimensional image train generator 68 to produce two-dimensional image trains 65a, 65b and 65c whose face directions are different from each other.

Further, the image synthesizer 69 combines the 3D image trains 63a, 63b and 63c with the two-dimensional image trains 65a, 65b and 65c, respectively. By pasting the still image trains 65a, 65b and 65c on the face of the stereo image model 62. Thus, the image synthesizer 69 can produce parallax image trains 66a, 66b and 66c in which the background two trees and person's faces in one of the trains are different from those in the other trains.

The image data generator 1 constructed as shown in FIG. 7 can also paste a separately captured image or the like on the stereo image model (polygon model or the like) and combines a two-dimensional image and a three-dimensional image to produce a parallax image train without using any special imaging method.

The image data forming the parallax image trains are sequentially displayed on the display screen 41 of the holographic stereogram printer 3 as having been described above. Thus, the exposure shutter 32 is opened for each image, and the images are sequentially recorded as a rectangular element hologram on the hologram recording medium 30.

As in the above, the embodiment of the present invention can paste a normally captured two-dimensional image as a texture on a three-dimensional image model prepared in advance to provide a three-dimensional hologram print approximate to an actual view without using any special imaging method apparatus. For example, 3D models of a Santa Claus's cap, mustache and beard, and clothing and also a background are prepared as CG data. On the other hand, a face portion is cut from a person's picture taken by a digital still camera for example, and pasted as a texture on the face portion of the Santa Claus in the 3D model image. As a result, the two-dimensional face image is synthesized on the three-dimensional polygon to produce a three-dimensional image of the Santa Claus. This is holographically printed to produce a three-dimensional unique Christmas card or the like for example.

The parallax image train produced by the image data generator 1 may be supplied to the holographic stereogram printer 3 via a network such as the Internet, WAN, LAN, radio communications or the like, removable medium such as FD, MD, CD-R, memory card or the like, video tape, hard disc, etc.

According to the present invention, it is possible to provide a hologram print of a three-dimensional image based on images obtained by photography without using any special imaging method. Conventionally, holographic stereogram can only be produced from a large amount of image information. According to the present invention, however, it is possible to produce a holographic stereogram by artificially acquiring only a small amount of two-dimensional information. Thus, a holographic stereogram can be provided inexpensively.

What is claimed is:

1. Method for generating image data usable in forming a hologram comprising the steps of:

generating a sequence of two-dimensional images depicting a first object viewed from different angles;

generating a sequence of images depicting a stereo model of a second object viewed from different angles;

combining the sequence of two-dimensional images with the sequence of images of the stereo model, by pasting a respective two-dimensional image depicting the first object viewed from a respective angle onto a portion of a corresponding image depicting the stereo model viewed from a corresponding angle; and generating a parallax image train depicting the stereo model with the first object pasted thereon viewed from different angles, thereby generating a parallax image train from which said hologram is formed.

2. The method according to claim 1, further comprising the step of sequentially recording each image of the parallax image train as an element hologram.

3. Method for generating image data usable in forming a hologram comprising the steps of:

generating two-dimensional image data including different views of a first object;

generating image data of a stereo model including image data representing at least a portion of a second object, said image comprising a polygon model of said second object representing a sequence of images of said second object when viewed from different angles;

producing a combined image by combining said two-dimensional image data onto said image data representing the portion of the second object, wherein said different two-dimensional views of the first object are combined onto said stereo model, and wherein said sequence of images represents corresponding changing views of said portion of said stereo model; and generating a parallax image train based on said image of two-dimensional data combined onto said stereo model, thereby generating a parallax image train from which said hologram is formed, said parallax image train including the different views of the first object following the changing views of said stereo model.

* * * * *